United States Patent [19]
Okuda et al.

[11] Patent Number: 4,777,695

[45] Date of Patent: Oct. 18, 1988

[54] WINDSHIELD WIPER WITH MEANS FOR ADJUSTING FORCE WITH WHICH WIPER BLADE IS PRESSED AGAINST WINDSHIELD

[75] Inventors: Haruo Okuda, Warabi; Yukiho Murata, Sagamihara, both of Japan

[73] Assignees: Nissan Motor Co., Ltd., Yokohama; Ichikoh Industries Limited, Tokyo, both of Japan

[21] Appl. No.: 136,802

[22] Filed: Dec. 22, 1987

[30] Foreign Application Priority Data

Dec. 23, 1986 [JP] Japan ................... 61-305501

[51] Int. Cl.⁴ ............................................. B60S 1/34
[52] U.S. Cl. .............................. 15/250.2; 15/250.35
[58] Field of Search ............. 15/250.19, 250.2, 250.34, 15/250.35

[56] References Cited

U.S. PATENT DOCUMENTS

4,472,854  9/1984  Bauer et al. ............... 15/250.2
4,718,139  1/1988  Okuda et al. .............. 15/250.34

FOREIGN PATENT DOCUMENTS

59-167349  9/1984  Japan.
62-134355  6/1987  Japan.

*Primary Examiner*—Peter Feldman
*Attorney, Agent, or Firm*—Foley & Lardner, Schwartz, Jeffery, Schwaab, Mack, Blumenthal & Evans

[57] ABSTRACT

A control lever is driven by a driving unit to cause variation in tension of a coil spring and therefore variation in force with which a wiper blade is pressed against a windshield. The driving unit is disposed in an arm head and includes a geared motor, a male screw member in the form of a bolt and secured to an output shaft of the geared motor and a female screw member having an internally threaded socket portion screwed onto the male screw member and a sliding portion in the form of a rectangular bar and installed in a guide member for longitudinal movement but against rotation. The output shaft of the geared motor, male screw member and the female screw member are so arranged as to have axes in line with each other and exending longitudinally of the arm head.

6 Claims, 2 Drawing Sheets

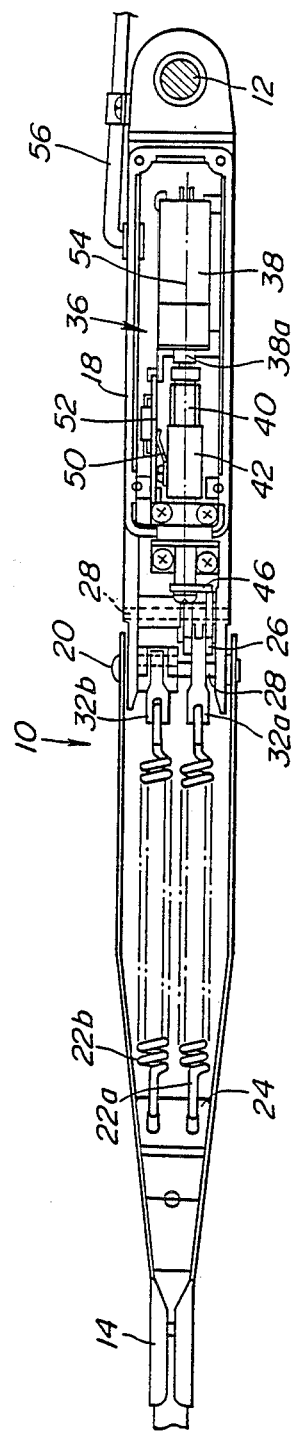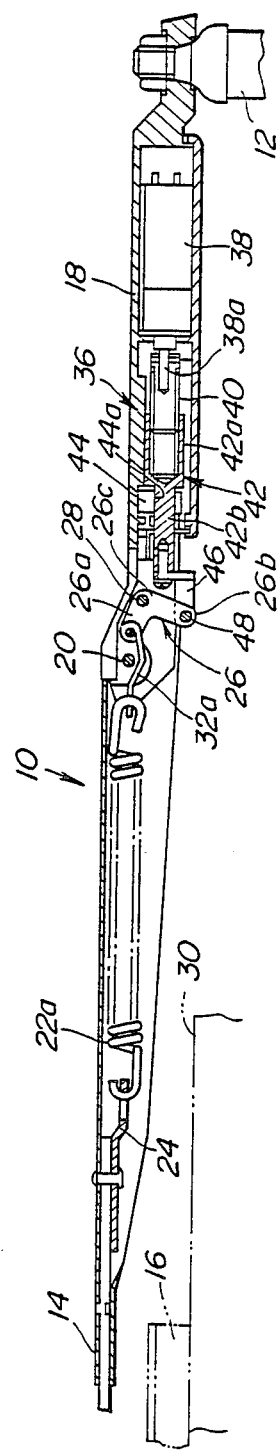

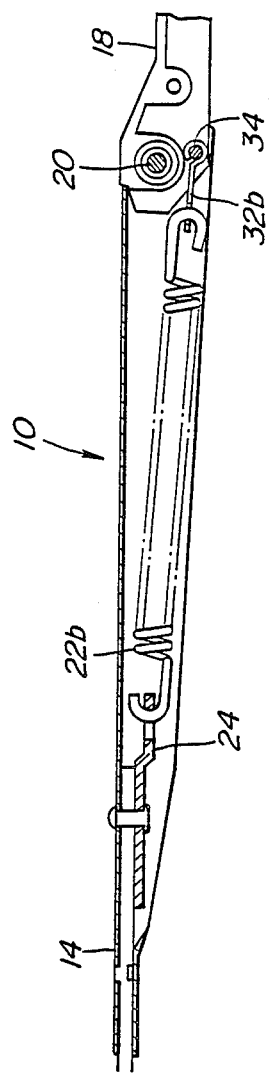

WINDSHIELD WIPER WITH MEANS FOR ADJUSTING FORCE WITH WHICH WIPER BLADE IS PRESSED AGAINST WINDSHIELD

BACKGROUND OF THE INVENTION

1. Field of the Invention

The present invention relates in general to wipers for motor vehicles and more particularly to a windshield wiper of the kind having means for adjusting a force with which a wiper blade is pressed against a windshield.

2. Description of the Prior Art

A windshield wiper of the above described kind is known in the art as disclosed in Japanese Patent Application No. 59-167349. The windshield wiper known from that application is bulky due to its means for performing the above described adjustment and furthermore has a difficulty in attaining an accurate or delicate adjustment since an amount of adjustment does not precisely correspond to a resulting variation in the pressing force.

In order to solve this problem, an improved windshield wiper had been proposed by the assignee of this application as described in Japanese Patent application No. 60-275206. This windshield wiper however is bulky and heavy and furthermore costly. This is because its means for performing the above described adjustment requires a number of constituent parts and a relatively long assembly work.

SUMMARY OF THE INVENTION

In accordance with the present invention, there is provided a novel and improved wiper assembly which comprises an arm head, a wiper arm swingably attached to the arm head, a wiper blade carried on the wiper arm, a coil spring for driving the wiper arm in a predetermined direction relative to the arm head, an L-like control lever having first and second ends and rotatably mounted on the arm head in such a way as to have an axis of rotation between the first and second ends, the coil spring having an end fixed to the wiper arm and the other end attached to the first free end of the control lever, driving means installed in the arm head for driving the control lever to vary in angular position, the driving means including a geared motor having a built-in reduction gearing and an output shaft, a male screw member secured to the output shaft of the geared motor to rotate together therewith, a female screw member having an internally threaded socket portion at which it is screwed onto the male screw member, the female screw member is intalled for longitudinal movement but against rotation and a connecting member having an end pivotally connected to the second end of the control lever and the other end secured to the female screw member, in which the male screw member, female screw member and the output shaft of the geared motor are so arranged as to have axes in line with each other and extendling logitudinally of the arm head.

The above structure is effective for overcoming the above noted shortcomings inherent in the prior art device.

It is accordingly an object of the present invention to provide a novel and improved wiper assembly which is compact in size, light in weight and of small manufacturing and assembling expense.

It is another object of the present invention to provide a novel and improved wiper assembly which is reliable in operation, i.e., can perform delicate or precise adjustment of the above noted pressing force with ease.

BRIEF DESCRIPTION OF THE DRAWINGS

FIG. 1 is a partly cutaway bottom view of a windshield wiper according to an embodiment of the present invention; and FIGS. 2 and 3 are longitudinal sectional views of the windshield wiper of FIG. 1.

DETAILED DESCRIPTION OF THE PREFERRED EMBODIMENT

Referring to FIGS. 1 to 3, a windshield wiper according to an embodiment of the present invention is generally indicated by the reference numeral 10 and shown as comprising a wiper pivot 12 adapted to be driven by a wiper motor assembly (not shown), an elongated wiper arm 14 having a channel-shaped portion, a wiper blade 16 carried on the wiper arm 14 in a conventional manner and an arm head 18 having an end at which it is installed on the wiper pivot 12 for rotation or oscilation together therewith and the other end to which the wiper arm 14 is swingably attached by means of a connecting pin 20.

The windshield wiper 10 further comprises two parallel coil springs 22a and 22b which are disposed within the channel shaped portion of the wiper arm 14 in such a way as to extend longitudinally thereof and adapted for driving the wiper arm 14 about the connecting pin 20. More specifically, as shown in FIG. 2, the coil spring 22a has a hooked end attached to an apertured holder 24 which is in turn secured to the wiper arm 14 and the other hooked end attached to an end of a connecting lever 32a. The connecting lever 32a in turn pivotally attached at the other end to a first free end 26a of an L-like or angled control lever 26. The control lever 26 has a second free end 26b in opposition to the first free end 26a and rotatably or swingably mounted at a place 26c intermediate between the first and second free ends 26a and 26b on the arm head 18 by means of a control lever pivot 28. The wiper arm 14 is thus driven by the coil spring 22a about the connecting pin 20 and urges the wiper blade 16 against a windshield 30 with a force that varies as the control lever 26 rotates or turns about the connecting pin 20, i.e., as the control lever 26 changes its angular position. On the other hand, as shown in FIG. 3, the coil spring 22b is attached at a hooked end to the apertured holder 24 and at the other hooked end to an end of a connecting lever 32b. The connecting lever 32b is swingably attached at the other end to a supprting pin 34 fixed to the arm head 18.

The wiper arm 14 is driven by the coil spring 22b about the connecting pin 20 with a force that is kept constant irrespective of the angular position of the control lever 26. The force exerted by the coil spring 22b thus constitutes a fixed part of the wiper arm driving force, i.e., a fixed part of the force with which the wiper blade 16 is pressed against the windshield 30. On the other hand, the force exerted by the coil spring 22a constitutes a variable part of the wiper arm driving force, i.e., a variable part of the force with which the wiper blade 16 is pressed against the windshield 30. In other words, the coil springs 22a and 22b are adapted so that one exertes a constant pressing force and the other exerts a varying pressing force that is applied together with the constant pressing force to the wiper blade 16 and varied so as to adjust the overall pressing force to a desired value.

The angular position of the control lever 26 is varied by means of a driving unit 36 disposed within the arm head 18. The arm head 18 is in the form of an elongated hollow box of a rectangular cross section. The driving unit 36 includes a small-sized electric motor having a built-in reduction gearing, i.e., a geared motor 38. The geared motor 38 has an output shaft 38a and is arranged so that the output shaft 38a extends longitudinally of the arm head 18 and substantially in parallel with the coil springs 22a and 22b when viewed in FIG. 1. Further, the output shaft 38a of the geared motor 38 is elongated to intersect the axis of the control lever pivot 28 at right angles when viewed in FIG. 1. The driving unit 36 further includes a male screw member 40 and a female screw member 42. The male screw member 40 is in the form of a bolt and arranged in line with the output shaft 38a of the geared motor 38 and secured to same. The female screw member 42 is arranged in line with the male screw member 40 and has a socket-like portion 42a which is internally threaded to slide onto the male screw member 40. The female screw member 42 further has a sliding portion 42b which is in the form of a rectangular bar and received in a stationary guide member 44. The guide member 44 has a rectangular guide hole 44a in which the sliding portion 42b of the female screw member 42 is installed for axial movement but against rotation. The driving unit 36 further includes a link 46 interconnecting the female screw member 42 to the control lever 26. More specifically, the link 46 has an end pivotally connected to the second free end 26b of the control lever 26 by means of a connecting pin 48 and the other end bolted or otherwise secured to an end of the female screw member 42 located remoter from the output shaft 38a of the geared motor 38.

A sliding electrical contact 50 is carried on the female screw member 42 and brought into contact with a print circuit 52 of a print circuit board so that as the female screw member 42 moves longitudinally thereof relative to the stationary guide member 44 the sliding electrical contact 50 slides on the print circuit 52 to switch the circuit for thereby controlling supply of power to the geared motor 38, e.g., for controlling the direction of current flow through the geared motor 38.

By designing the print circuit 52 suitably, the force with which the wiper blade 16 is pressed against the windshield 30 can be selectively adjusted to two or more than two values.

Indicated by the reference numeral 56 is a power line for supplying power to the geared motor 38 under control of the print circuit 52.

In operation, when it is desired to increase the pressing force, the geared motor 38 is actuated so that the output shaft 38a rotates in a predetermined direction together with the male screw member 40. Rotation of the male screw member 40 in a predetermined direction causes the female secrew member 42 to move toward the control lever 26, thus driving the control lever 26 clockwise about the pivot 28. As a result, the tension of the coil spring 22a is increased and therefore the force with which the wiper blade 30 is pressed against the windshield 30 is adjusted to a desired larger value. In this instance, the amount of logitudinal movement of the female member 42 is controlled by the print ciurcuit 52 and the sliding electrical contact 50. On the other hand, when it is desired to reduce the pressing force, the geared motor 38 is actuated so that the output shaft 38a rotates in a predetermined opposite direction together with the male screw member 40. The male screw member 40 is thus caused to move away from the control lever 26, thus allowing the control lever 26 to rotate counterclockwise in FIG. 2. The tension of the coil spring 22a is thus reduced and therefore the force with which the wiper blade 30 is pressed against the windshield 24 is adjusted to a desired smaller value.

In the foregoing, it is to be noted that the male screw member 40, the female screw member 42 and the geared motor 38 are axially aligned or arranged in line with each other, i.e., the axes thereof are so arranged as to coincide with a straight reference line 54 that is substantially parallel with the longitudinal direction of the coil springs 22a and 22b and therefore with the longitudinal direciton of the wiper arm 14. This is effective for reducing in thickness and width the arm head 18 and the wiper arm 14.

It is further to be noted that the means for adjusting the pressing force is constituted by a relatively small number of constituent parts and therefore compact in size and light in weight, thus making it possible to reduce the manufacturing and assembling expense.

It is to be understood that the windshield wiper of the present invention can perform delicate or precise adjustment of the pressing force readily and assuredly since the operation of the geared motor 36 is controlled by the sliding electrical contact 50 and the print circuit 52 accurately and assuredly.

It is to be understood that the above-described embodiment is merely exemplary and is susceptible to modifications, substitutions and variations by those skilled in the art. For example, the present invention could be applied to a rear window wiper. Further, the coil spring 22b could be attached to the first free end 26a of the angled lever 26 similarly to the coil spring 22a. In this instance, the above described pressing force could be adjusted to a smaller value, i.e., minimumly to zero.

What is claimed is:

1. A wiper assemby comprising:
an arm head;
a wiper arm swingably attached to said arm head;
a wiper blade carried on said wiper arm;
a coil spring for driving said wiper arm in a predetermined direction relative to said arm head;
an L-like control lever having first and second ends and rotatably mounted on said arm head in such a way as to have an axis of rotation between said first and second ends;
said coil spring having an end fixed to said wiper arm and the other end attached to said first end of said control lever; and
driving means installed in said arm head for driving said control lever to vary in angular position;
said driving means including a geared motor having a built-in reduction gearing and an output saft, a male screw member secured to said output shaft of said geared motor to rotate together therewith, a female screw member having an internally threaded socket portion at which it is screwed onto said male screw member, said female screw member further having a sliding portion, a stationary guide member having an opening in which said sliding portion of said female screw member is installed for longitudinal movement but against rotation and a connecting member having an end pivotally connected to said second free end of said control lever and the other end secured to said female secrew member;

in which said male screw member, female screw member and said output shaft of said geared motor are so arranged as to have axes in line with each other and extending longitudinally of said arm head.

2. A wiper assembly as set forth in claim 1 wherein said driving means further comprises a print circuit and a sliding electrical contact carried on said female screw member to move together therewith and cooperating with said print circuit for controlling supply of power to said geared motor.

3. A wiper assembly as set forth in claim 2, wherein said axes of said male screw member, female screw member and said output shaft of said geared motor are so arranged as to intersect said axis of rotation of said control lever at right angles when viewed in a plane of projection.

4. A wiper assembly as set forth in claim 3 wherein said male screw member is in the form of a bolt and said sliding portion of said female screw member is in the form of a rectangular bar, said opening of said guide memeber being rectangular correspondingly to said rectangular sliding portion of said female screw member.

5. A wiper assembly as set forth in claim 1 further comprising a second coil spring installed in said wiper arm in such a way as to drive said wiper arm in the same direction as said first mentioned coil spring, said second coil spring being arranged in parallel with said first mentioned coil spring and fixed at an end to said wiper arm and at the other end to said arm head.

6. A windshield wiper for a motor vehicle comprising:
- a wiper pivot;
- a arm head installed on said wiper pivot to swing together therewith;
- a wiper arm attached to said arm head in such a way as to be swingable about an axis relative to said arm head;
- a wiper blade carried on said wiper arm;
- first and second coil springs installed on said wiper arm in such a way as to drive said wiper arm in a predetermined direction relative to said arm head;
- said first coil spring being attached at an end to said wiper arm and at the other end to said arm head so that said wiper arm is driven with a substantially constant force by said first coil spring;
- an L-like control lever installed on said arm head in such a way as to be rotatable between first and second angular positions about an axis and have first and second ends between which said axis of rotation of said control lever is located;
- said second coil spring having an end attached to said wiper arm and the other end attached to said second end of said control lever so that said wiper arm is driven by said second coil spring with a force that varies depending upon the angular position of said control lever; and
- driving means installed in said arm head for driving said control lever to selectively assume one of said first and second angular positions for thereby varying a force with which said wiper blade is pressed against the windshield;
- said driving means including a geared motor having a built-in reduction gearing and an output shaft, a male screw member in the form of a bolt arranged in line with said output shaft and secured to same to rotate together therewith, a female screw member having an internally threaded socket portion at which it is screwed onto said male screw member, said female screw member further having a sliding portion, a stationary guide member having an opening in which said sliding portion of said female screw member is installed for logitudinal movement but against rotation, a connecting member having an end pivotally connected to said second end of said control lever and the other end secured to said female screw member, a print circuit and a sliding electrical contact carried on said female screw member to move together therewith and cooperating with said print circuit board to control supply of power to said geared motor;
- in which said male screw member, female screw member and said output shaft of said geared motor have axes which are arranged in line with each other and substantially parllel to the longitudinal direction of said first and second coil springs; and
- in which said axis of rotation of said control lever is so arranged as to intersect said axes of said male screw member, said female screw member and said output shaft of said geared motor at right angles when viewed in a plane of projection.

* * * * *